(12) United States Patent
Stewart et al.

(10) Patent No.: US 11,099,091 B2
(45) Date of Patent: Aug. 24, 2021

(54) ADVANCED TIRE MONITORING SYSTEM

(71) Applicant: Schrader Electronics Limited, Antrim (GB)

(72) Inventors: William David Stewart, Antrim (GB); Christopher Arnold, Antrim (GB); Stephen Robb, Crumlin (GB); Ian Elliott, Ballybogey (GB)

(73) Assignee: Schrader Electronics Limited, Antrim (GB)

( * ) Notice: Subject to any disclaimer, the term of this patent is extended or adjusted under 35 U.S.C. 154(b) by 25 days.

(21) Appl. No.: 15/388,775

(22) Filed: Dec. 22, 2016

(65) Prior Publication Data

US 2017/0174014 A1 Jun. 22, 2017

(30) Foreign Application Priority Data

Dec. 22, 2015 (GB) ...................................... 1522644
Nov. 7, 2016 (GB) ...................................... 1618758

(51) Int. Cl.
*G01L 17/00* (2006.01)
*B60C 23/04* (2006.01)
*G01D 5/20* (2006.01)

(52) U.S. Cl.
CPC .......... *G01L 17/00* (2013.01); *B60C 23/0437* (2013.01); *B60C 23/0474* (2013.01); *B60C 23/0483* (2013.01); *B60C 23/0493* (2013.01); *G01D 5/20* (2013.01); *B60C 23/0447* (2013.01)

(58) Field of Classification Search
CPC .............. B60C 23/0447–0466; B60C 23/0471
See application file for complete search history.

(56) References Cited

U.S. PATENT DOCUMENTS

| | | | | |
|---|---|---|---|---|
| 6,087,930 A | * | 7/2000 | Kulka | B60C 23/0493 340/447 |
| 2005/0242939 A1 | | 11/2005 | Hagl et al. | |
| 2006/0012470 A1 | * | 1/2006 | Chakam | B60C 23/0433 340/445 |

(Continued)

FOREIGN PATENT DOCUMENTS

CN 202480794 U 10/2012
CN 205523456 U 8/2016
(Continued)

OTHER PUBLICATIONS

Search Report under Section 17 for Application GB1618758.5 dated Apr. 26, 2017, from UK Intellectual Property Office.
(Continued)

*Primary Examiner* — Alexander A Mercado
(74) *Attorney, Agent, or Firm* — Mark H. Whittenberger; Holland & Knight LLP

(57) ABSTRACT

A tire pressure monitoring system comprising a tire pressure monitoring device for mounting on an internal surface of a tire and including a pressure sensor for monitoring the fluid pressure in the tire. The system has an RFID tag located on the tire separately from the tire pressure monitoring device. In response to detecting a tire pressure event from monitoring the fluid pressure of said fluid, the tire pressure monitoring device causes the RFID to transmit data, which is received by the tire pressure monitoring device.

19 Claims, 9 Drawing Sheets

(56) References Cited

U.S. PATENT DOCUMENTS

| | | | | |
|---|---|---|---|---|
| 2006/0132356 A1* | 6/2006 | Dulac | ................ | B60C 23/0416 |
| | | | | 342/173 |
| 2006/0142911 A1* | 6/2006 | Allard | ................ | B60C 23/0416 |
| | | | | 701/33.9 |
| 2006/0259214 A1* | 11/2006 | McQuade | ........... | B60C 23/0413 |
| | | | | 340/445 |
| 2007/0180901 A1* | 8/2007 | Katou | ................ | B60C 23/0408 |
| | | | | 73/146.2 |
| 2010/0007465 A1* | 1/2010 | Benedict | ............... | B60C 23/007 |
| | | | | 340/10.1 |
| 2010/0085212 A1* | 4/2010 | Gerardiere | ............ | B60C 23/007 |
| | | | | 340/870.28 |
| 2011/0166446 A1* | 7/2011 | Whitmore, III | ....... | A61B 90/39 |
| | | | | 600/426 |
| 2012/0323529 A1* | 12/2012 | Kessler | ............... | B60C 23/0416 |
| | | | | 702/179 |
| 2014/0150542 A1* | 6/2014 | Townsend | ........... | B60C 23/0491 |
| | | | | 73/146 |
| 2014/0210607 A1* | 7/2014 | Patterson | ............ | B60C 23/0415 |
| | | | | 340/447 |
| 2014/0368327 A1* | 12/2014 | Darrer | .............. | G06K 19/07764 |
| | | | | 340/447 |
| 2015/0239306 A1* | 8/2015 | Bracq | ................ | B60C 23/0408 |
| | | | | 702/140 |
| 2017/0106706 A1* | 4/2017 | Bettecken | ........... | B60C 23/0408 |
| 2018/0111429 A1* | 4/2018 | Matsuoka | ........... | B60C 23/0416 |

FOREIGN PATENT DOCUMENTS

| | | |
|---|---|---|
| DE | 19924830 A1 | 11/2000 |
| JP | 2005346675 A | 12/2005 |
| WO | 2016097836 A1 | 6/2016 |

OTHER PUBLICATIONS

GB Search Report for Application No. GB1522644.2 from the GB intellectual Property Office dated Jun. 29, 2016.

* cited by examiner

ADVANCED TIRE MONITORING SYSTEM

FIELD OF THE INVENTION

The present invention relates to tire monitoring sensors designed to be mounted directly to the surface of a tire.

BACKGROUND TO THE INVENTION

Tire Pressure Monitoring Systems (TPMS) have been in wide spread commercial use for several years. The TPMS devices currently available on the market are typically mounted to the wheel rim either by attachment to the valve stem or by a belt around the rim itself. These attachment means are sufficient for allowing the TPMS device to monitor the pressure and temperature of the air inside the tire cavity. However these attachment means cannot provide an accurate assessment of the tire's footprint area. The footprint area of a tire can be used to determine a number of parameters which will be useful in the future in enhancing vehicle safety monitoring and handling characteristics of vehicles.

Another key aspect to the change in attachment means from the rim to the tire is the ability to monitor the life and condition of the tire itself. This can be further enhanced by embedding an RFID tag in the tire which the TPMS device is able to communicate with.

It would be desirable to address some of the challenges involved in mounting a tire monitoring device directly to the tire and also to enable more advanced features of the tire monitoring device only possible by mounting the device directly to the tire.

SUMMARY OF THE INVENTION

A first aspect of the invention provides a tire pressure monitoring system comprising:

a tire pressure monitoring device for mounting on an internal surface of a tire and including a pressure sensor for monitoring the pressure of a fluid in the tire;

an electronic data storage device for location on said tire separately from said tire pressure monitoring device, wherein said tire pressure monitoring device and said data storage device each includes wireless communication means for supporting wireless communication between each other, and wherein, in response to detecting a tire pressure event from monitoring the pressure of said fluid, said tire pressure monitoring device is configured to cause said electronic data storage device to transmit data, the tire pressure monitoring device being configured to receive the transmitted data.

Typically, said tire pressure monitoring device is configured to detect said tire pressure event upon detecting an increase in said fluid pressure corresponding to a tire inflation event.

Said tire pressure monitoring device may be configured to detect said tire pressure event upon detecting an increase in said fluid pressure by more than a threshold amount and/or at higher than a threshold rate.

The wireless communication means conveniently comprises a respective transponder. The respective transponder typically comprises a respective electromagnetic coil, preferably a low frequency (LF) transponder coil.

In typical embodiments, said electronic data storage device is an RFID device of the type commonly referred to as an RFID tag.

Said electronic data storage device typically comprises a memory for storing said data. Said data may comprise data that is indicative of one or more tire parameters, or characteristics, of said tire. Alternatively, or in addition, said data comprises data that is indicative of one or more parameters relating to a vehicle. Alternatively, or in addition, said data comprises configuration data for the tire pressure monitoring device.

Preferably said tire pressure monitoring device is configured to cause said electronic data storage device to transmit data by energising the tire pressure monitoring device transponder, preferably the respective electromagnetic coil, to create an electromagnetic field, said data storage device being configured to detect said electromagnetic field with the data storage device transponder, preferably the respective electromagnetic coil, and to transmit said data in response to said detection.

It is preferred that said data storage device is configured to transmit said data by modulating the excitation of the data storage device transponder, preferably the respective electromagnetic coil, preferably by modulating the current in the coil.

Conveniently said data storage device is provided in or on a mount for said tire pressure monitoring device, preferably embedded in said mount. The data storage device is advantageously located beside the tire pressure monitoring device, i.e. laterally spaced from the tire pressure monitoring device as opposed to underneath it.

Preferably said data storage device is provided in or on said tire, preferably embedded in said tire.

Said electronic data storage device may be powered in use by electrical power induced in its transponder by an electromagnetic field, preferably an electromagnetic field generated by the transponder of said tire pressure monitoring device.

Optionally said tire pressure monitoring device includes first and second transponder coils spaced apart in a first direction, said tire pressure monitoring device being operable in an orientation determination mode in which it is configured to compare the respective strength of a respective signal induced in each of said transponder coils and to determine an orientation of said tire pressure monitoring device and/or an orientation of a wheel in which said device is located in use, based on said comparison. Preferably said first direction is parallel with an axis of rotation of a wheel in which said tire pressure monitoring device is mounted in use.

The system may further include at least one other transponder coil spaced apart from at least one of said first and second transponder coils in a direction perpendicular to said first direction, and wherein in said orientation determination mode said tire pressure monitoring device is configured to compare the respective strength of a respective signal induced in each of said transducer coils and to determine an orientation of said tire pressure monitoring device and/or an orientation of a wheel in which said device is located in use, based on said comparison.

Optionally said tire pressure monitoring device is provided in an enclosure having a base and a lid, the base and lid being fixed together by one or more laser welds.

Another aspect of the invention provides a tire monitoring device for mounting on an internal surface of a tire, the device comprising first and second transponder coils spaced apart in a first direction, said tire pressure monitoring device being operable in an orientation determination mode in which it is configured to compare the respective strength of a respective signal induced in each of said transponder coils and to determine an orientation of said tire pressure monitoring device and/or an orientation of a wheel in which said device is located in use, based on said comparison.

One aspect of the invention relates to Radio Frequency Identification (RFID) communication and activation between a tire monitoring sensor, in particular a TPMS sensor, and an electronic data storage device provided in or on the tire.

For a TPMS device mounted to the internal surface of a tire, it may be desirable to also have a RFID tag (or other electronic data storage device capable of communicating wirelessly with a compatible electronic device) mounted to or embedded in the tire as well, which can be programmed with tire parameter data indicative of one or more characteristics of the tire itself and/or with data comprising configuration setting(s) for programming the TMPS device. If an RFID tag is installed in a tire, then a means for communication between the TPMS device and the RFID tag would be required.

The RFID tag embedded in, or mounted on, the tire can be programmed to contain data indicative of one or more tire parameters, for example identifying one or more characteristics about the tire, including for example generic characteristics of the make/model of tire such as size, type, speed and load ratings, and tread depth, rubber composition, stiffness, thermal coefficients etc., and/or characteristics unique to the individual tire such as manufacture date, ID and owner. Alternatively, or in addition, said data comprises data that is indicative of one or more parameters relating to a vehicle, in particular the vehicle on which the tire pressure monitoring system is installed or suitable for installation on. Alternatively or in addition the data stored by the RFID tag may comprise data for configuring the TPMS device. The configuration data may for example comprise programming instructions and/or computer program code for partially or fully configuring the TPMS device. The configuration data may for example comprise settings or values for any one or more of: programmable pressure threshold(s), periodicity, resolution and/or range of sensor operations, sampling frequency, transmission frequency, data and/or signal formats, and/or other configurable parameter(s) of the TPMS device, and/or data (e.g. one or more data flags) for enabling or disabling one or more features supported by the TPMS device, for example a tread wear detection function or vertical load determination function. The RFID tag is preferably a passive device which does not have its own power supply. It would be impractical and expensive to replace a power supply, and a battery powered device would be larger and heavier than a passive alternative. This additional size and weight would place extra strain on the means of attaching the RFID tag to the tire and leave the RFID tag more prone to damage. Instead a passive device which can take the power it needs from its surroundings or from a device, in communication with it, is preferable. One method to achieve this is to use an RFID tag with an antenna, typically comprising a transponder coil, which allows it to be powered by inductive coupling to receive energy from an external primary antenna, typically a transponder coil, of a compatible electronic device, commonly referred to as a reader. The coupling between the tag antenna and the external primary coil can also be used to communicate data wirelessly between the tag and the reader. In preferred embodiments, the tire monitoring sensor is equipped to act as an RFID reader.

It is possible for the RFID tag and tire monitoring sensor (which in preferred embodiments is a TPMS sensor) to communicate wirelessly by radio transmissions or near field induction. If the RFID tag has its own dedicated power supply it is possible to use ultra-high frequency (UHF) radio transmissions such as 315 or 433 MHz. However it would be preferable not to require a dedicated power supply for the RFID tag. Alternatively a passive RFID tag may be energized in use by the TPMS device in order to facilitate interrogation, which typically includes the transfer of said data from the RFID tag to the TPMS sensor. For example if both the tire monitoring and RFID tag use transponder coils for the communication means, an effective means for transferring energy and data can be used, although the range will be relatively short. Preferably these coils would be tuned to 125 kHz, or to another frequency in the low frequency (LF) range (30 kHz to 300 kHz), or in the high frequency range (3 MHz to 30 MHz). A LF signal has an additional advantages of a short range making any communication limited to devices in close proximity. This will limit the degree of crosstalk from devices further away. In addition LF has become a de facto TPMS standard for communicating data to the TPMS device.

Preferably the TPMS device comprises at least a pressure sensor, RF transmitter, a central controller including a memory, a power source and a LF transceiver. The LF transceiver may be used to send and receive communications between the TPMS device and the RFID tag.

The RFID tag preferably comprises a memory chip, a receiver circuit and an LF coil. The LF coil may act as a means of receiving energy and communication with the TPMS device Energising and communicating with the RFID tag can put a significant strain on the battery life of the TPMS device if performed on a regular basis. Therefore it is preferred that this process only be carried out when a TPMS device is being installed on a tire. While it is possible for a technician to manually initiate communication between the TPMS device and RFID tag by giving a command signal to the TPMS device using an communication means such as a Hand tool over a wired or wireless connection, it is preferred that this process is triggered automatically without the need for a technician to manually initiate the process. Therefore if the triggering of the communication can be initiated by an event which already takes place during the installation of a tire on a wheel rim, then there is no need to alter the current tire installation process. One such event is the rapid inflation of the tire during initial fitment of the tire to the rim. This rapid inflation can be detected by the TPMS device and the TPMS device can initiate the communication if the rate and magnitude of the pressure increase is indicative of this installation process. This would also mean if for any reason the TPMS device must be replaced, the process by which the new TPMS device is installed will automatically include a communication between the new TPMS device and the RFID tag when the tire is inflated after the installation of the replacement TPMS device. Alternatively or in addition the TPMS device may be programmed to write data, for example indicating distance travelled or load carried, to the RFID tag upon the detection of an event such as a rapid deflation or the detection of a low pressure threshold violation which indicates for example the removal of the tire from the rim.

Another aspect of the invention relates to detection of the orientation of a tire monitoring sensor, especially a tire mounted TPMS sensor, using at least two transponder coils, preferably a pair of LF coils It is advantageous to have multiple LF coils (or other transponder coils) on the TPMS device. Having more than one spaced apart coil allows the TPMS device to determine its orientation with respect to an LF field source, or other relevant electromagnetic field source. In this context an LF coil is an electromagnetic coil that is responsive to electromagnetic radiation in the LF range to generate a corresponding electrical signal, and/or that will generate electromagnetic radiation in the LF range in response to being fed with an electrical signal.

Traditional TPMS devices are mounted to the rim of a tire with a fixed pre-determined orientation due the fact the valve stem must be installed in a specific orientation. TPMS devices mounted to the surface of the tire do not have such constraints on orientation. This can cause a problem in ensuring that certain sensors such as the shock sensors are mounted in the right orientation or at least to ensure their orientation is known that any calculations based on the information they provide is used accurately. The orientation of a shock sensor or other motion detection device must be known in order to accurately determine information about vertical load and wheel speed.

When an LF field from a fixed source is applied to a TPMS sensor with multiple spaced apart coils, the coils experience different field strengths of LF as a result of their separation, and produce a corresponding output signal. For example a device with two coils would be able to tell a left/right orientation by determining which of the two coils is closer to the LF source. The coils should be spaced apart in a direction that is useful for orientation determination, typically along a side-to-side or front-to-rear axis of the TPMS sensor.

One or more additional coils could also be provided to determine a 360 degree orientation about a notional reference axis. However it would be preferable that this is not needed. Instead a (typically rubber) mounting is preferably provided on the internal tire surface for receiving the TPMS sensor in a limited number of orientations, e.g. a left orientation or a right orientation between which the TPMS sensor's orientation is rotated by 180 degrees about a reference axis that is typically substantially normal to the tire surface at the point of mounting. The left right orientation issue is of particular relevance to trucks with dual wheels where two wheels and mounted facing each other. It is however possible through the use of for example 4 coils radially spaced by approximately 90 degrees to each other with respect to the reference axis to determine the orientation of the TPMS device through a 360 degree rotation with respect to the reference axis. This however will increase the cost and size the device.

It is possible through the use of installation instructions to ensure that the TPMS sensor is initially installed in the desired orientation on a tire. However it is still possible to mount the tire to a wheel in two possible orientations. For this problem only two coils would be required to determine which of these orientations has been used.

A further aspect of the invention relates to programming location and orientation of a tire monitoring sensor.

Using a programming means such as an LF Hand tool, information about the wheel axle and orientation of the tire monitoring sensor can be programmed directly into the tire monitor's memory.

An important issue in mounting TPMS devices to a vehicle with one or more sets of duals wheels is the orientation of the TPMS device with respect to the orientation of the wheel. As dual wheels tend to be mounted in opposite orientations, it is important to know which orientation a specific wheel is in for automated location determination methods. Among the data that can be programmed into the sensor are, the relative position on the vehicle of the TPMS device, if the sensor is part of a dual wheel set and/or if the TPMS device is mounted in the inner or outer wheel.

A still further aspect of the invention relates to a laser welded housing for a tire monitoring sensor.

A tire mounted tire monitoring device is commonly known as a Tire Pressure Monitoring Sensor. It shares many electronic components with the well-known commercially successfully valve stem mounted TPMS devices. However there are advantages to mounting the TPMS on the tire itself, such as being able to measure characteristics of the tire such as vertical load or tread depth by accurately monitoring the shape of the tire footprint. This change in mounting position also presents additional challenges, in protecting the electronics due to the close proximity to porous rubber footprint area of the tire, which leaves the device more susceptible to moisture as water can collect in the footprint area and if placed in the tire footprint the device will be subject to high impact forces when entering the footprint area.

As a result a small light weight and robust housing is needed to protect the electronics both from moisture and high impact forces. A preferred option is to use a laser welded polymer enclosed housing. Laser welding provides a robust seal against moisture and allows for thicker more robust plastics to be used than alternative means of manufacture such as over moulding. Over moulding requires the polymer housing be flexible enough to deform around shape of the electronics and as a result the polymer is thin and prone to moisture penetration and in addition the over moulding process can damage the electronics.

Another aspect of the invention relates to a RFID tag (or other electronic data storage device capable or wireless communication) embedded in rubber bung or other mount.

The RFID tag is intended to be attached to the tire such that it is difficult to separate the RFID tag from the tire. One option is to embed the RFID tag in the rubber of the tire during the manufacture of the tire. Another option is to embed the RFID tag in a rubber bung which can be adhered to, e.g. by adhesive, welding or other suitable fixing means, or integrally formed with the inside surface of the tire, either the sidewall or the inner liner of the tread area. Optionally, the rubber bung can also be used to house the TPMS device, although it is preferable that the TPMS device be removable from the bung. The RFID tag will typically be installed to the tire before the TPMS device. It is preferable that during the installation of the RFD tag onto or in to the tire, that the RFID tag be programmed with whatever data it is intended to store, which may vary depending on the embodiment. As described above the data may comprise tyre parameter data, vehicle parameter data and/or configuration data for the TPMS. Programming of the RFID tag can be achieved through the use of wireless communication of data from a hand tool to the RFID tag. Programming of the TMPS device using the data from the RFID tag may involve updating software in the memory of the TPMS device, and/or setting one or more bits in a register of the TPMS device, e.g. a register for calibration settings that are determined by bit values stored in the register.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which.

DETAILED DESCRIPTION OF THE DRAWINGS

Figure 1:
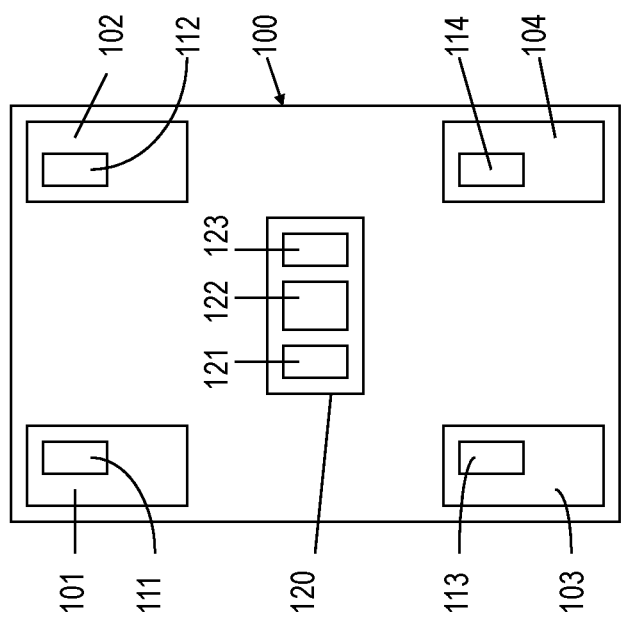
FIG. 1 is a schematic view of a wheeled vehicle with a Tire Pressure Monitoring System (TPMS) in which each wheel has a TPMS sensor mounted within the tire cavity.

FIG. 1 shows a system diagram of a wheeled vehicle 100, each wheel including a tire mounted on a rim. The arrangement and number of wheels can vary depending on the vehicle. In this example 4 wheels are shown 101, 102,103 and 104. Each wheel is fitted with a tire monitoring device, which in preferred embodiments is a tire pressure monitoring device, also known as a TPMS sensor or TPMS device, 111, 112, 113 and 114, being a wheel mountable component of a tire pressure monitoring system (TPMS). In preferred embodiments, the TPMS device is of a type that is intended for mounting on an internal surface of the tire, especially in the tread region but optionally on a side wall, rather than a type that is mounted on rim of the respective wheel, e.g. via the valve stem. The vehicle includes a control unit, for example electronic control unit (ECU) 120, which is configured to receive and process transmissions from the TPMS devices 111, 112, 113, 114 and as such forms part of the TPMS. The ECU 120 typically comprises at least a TPMS receiver 121, a controller 122, and a means of communicating with other vehicle electronics 123, such as a CAN or LIN bus. The TPMS receiver 121 receives signals, typically wirelessly, from the TPMS devices 111, 112, 113, 114 and the controller 122 is configured to process the signals to perform tire pressure monitoring, the nature of which may vary from system to system. The wireless communication means may comprise any wireless communication device(s) capable of supporting wireless communication, e.g. including a wireless receiver and a wireless transmitter (either of which optionally being a wireless transceiver) coupled to a respective antenna.

Figure 2:
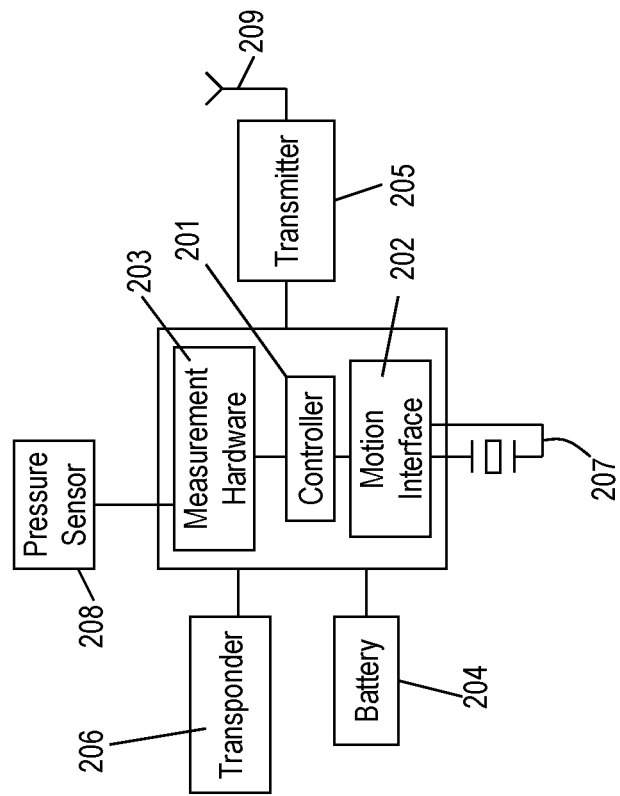
FIG. 2 is a schematic representation of a typical TPMS sensor.

FIG. 2 shows a block diagram of an embodiment of the TPMS device 111, 112, 113, 114. The TPMS device includes a central controller 201, which may comprise a suitably programmed processor, for example a dedicated microprocessor or a microcontroller, or other programmable processing device. Standard components such as a RAM memory, an ADC, an I/O interface, a clock oscillator and a central microprocessor (not shown) may be provided, the components typically being integrated onto a single chip. Alternatively, a custom microcontroller, for example an Application Specific Integrated Circuit (ASIC), designed from the ground up for the TPMS application may be used and may integrate ancillary components such as a temperature sensor.

The TPMS device is typically powered by a battery 204 although other micro power sources may be used, e.g. thermoelectric and/or piezoelectric generators and/or electromagnetic induction device, instead of or in addition to the battery. A transponder 206 may be provided to receive command signals (e.g. for programming the TPMS device), preferably at 125 kHz, as will be explained elsewhere this transponder may utilize one of more coils to provide power to and communicate with an RFID tag. A motion detector 207, for example comprising one or more shock sensors, accelerometer or roll switch, is typically provided and may interface with the controller 201 using any suitable conventional interface hardware 202.

A pressure sensor 208, e.g. a piezo resistive transducer or a piezoelectric or capacitance based pressure sensor, is provided for measuring the fluid (typically air or other gas) pressure in the respective tire. The pressure sensor 208 is connected to a measurement apparatus 203 for measuring the pressure using signals received from the pressure sensor 208 and for providing corresponding measurement information to the controller 201. During routine pressure measurement, under control of the controller 201 the measurement apparatus 203 samples the output of the pressure sensor 208 at intervals and communicates corresponding measurement data to the controller 201. Typically, the measurement apparatus 203 comprises hardware, i.e. electronic circuitry, for performing its measurement tasks, the configuration of which may vary but typically includes at least one amplifier, may include at least one filter and, for the purposes of routine pressure measurement at least, may include an analogue to digital converter (ADC) (not shown) for measuring pressure values. The measurement apparatus 203 may therefore be described as means for controlling the measuring of pressure.

A transmitter 205 with antenna 209 are used to makes transmissions to the vehicle ECU 120 preferably at 315 or 433 MHz.

In typical embodiments, the TPMS device 111, 112, 113, 114 may be generally similar to known TPMS devices and may share many features with those devices already well known to those skilled in the art. The fundamentals of the TPMS system may remain the same—a self-powered TPMS device attached in use to a vehicle wheel, in a manner that allows it to measure the pressure and optionally the temperature of the gas in the tire. Pressure measurements are usually taken periodically. In use the TPMS device transmits data representing the measured parameters to an external controller such as the vehicle ECU 120. A temperature sensor may also be provided. An oxygen sensor can be fitted to determine, if gas in the tire is air or atmospheric nitrogen.

Figure 3:
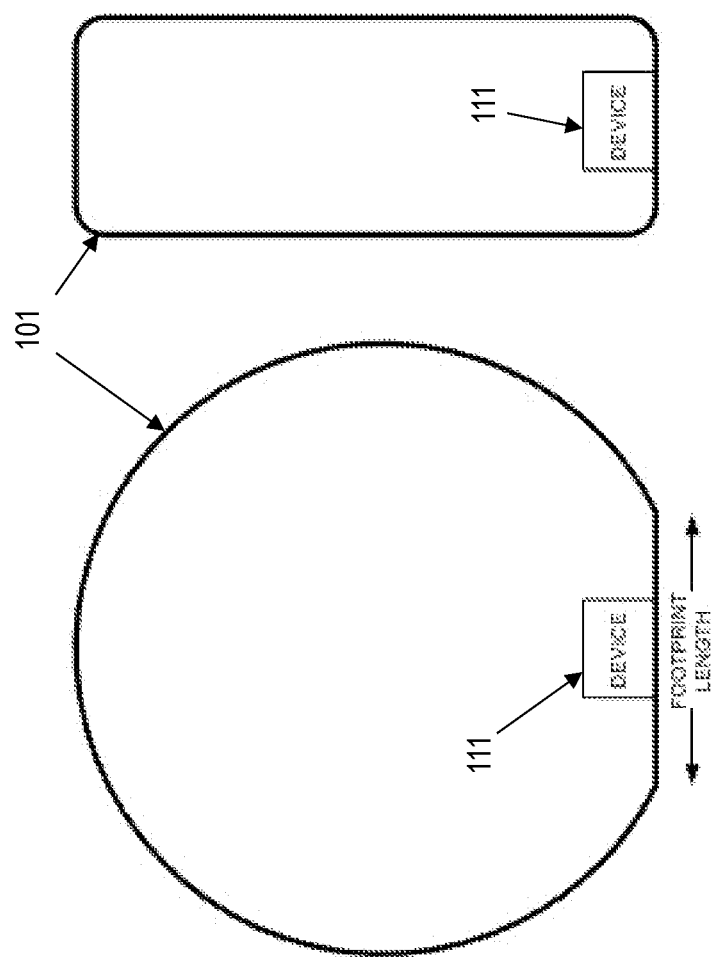
FIG. 3 shows side and end views of a TPMS sensor situated in the footprint of a tire.

FIG. 3 shows one of the TPMS devices 111 situated in the footprint area of the tire of its respective wheel 101 (the footprint area being the area of the tire that is deformed by engagement with a road surface). While the following description is provided in the context of the TPMS device 111, it will be understood that the same or similar description may apply to any one or more of the other TPMS devices that are part of the TPMS.

By mounting the TPMS device 111 to the inside surface of the tire tread, it is possible for the sensor to accurately track how long it has been in the footprint length with respect to the tire circumference and therefore derive the size of the footprint.

Figure 4:
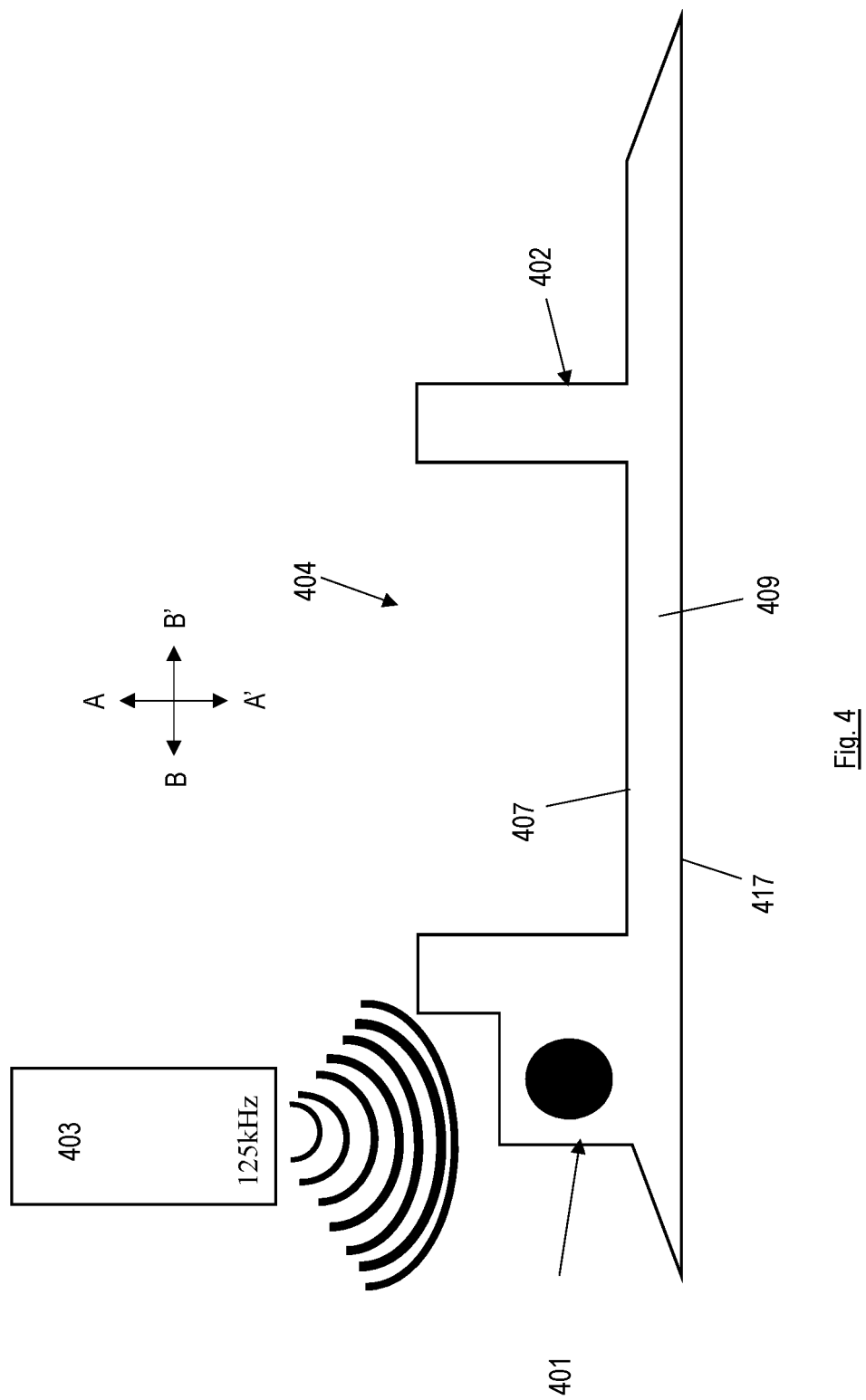
FIG. 4 is a sectional side view of a mount for a TPMS sensor, showing programming means for an RFID tag with the TPMS device absent.

FIG. 4 shows a mount 402 for the TPMS device 111. In preferred embodiments, the mount 402 is formed from rubber, although any other suitable material may be used. The mount 402 is shaped to define a cavity 404 for receiving the TPMS device 111. Typically, the cavity 404 is shaped such that the TPMS can be received in more than one orientation with respect to the mount 402. For example, a typical configuration is that the TPMS device 111 can be in a left orientation or a right orientation, the device 111 being rotated through 180 degrees about axis A-A' between orientations. The A-A' axis may be described as the normal axis and is usually substantially perpendicular to the bottom surface of 407 of the cavity 404 (or more generally to the base 409 of the mount 402) and/or to the internal surface of the tire at the location where the mount 402 is fixed to the tire during use.

The mount 402 includes a wireless-enabled electronic data storage device in the preferred form of an RFID tag 401. Other types of wireless-enabled electronic data storage device may be used, e.g. any wireless transponder. The RFID tag 401, or other device, is capable of storing data and transmitting the stored data wirelessly, typically in response to being interrogated by a co-operable remote device (sometimes referred to as a reader). To this end, the RFID tag 401, or other device, includes electronic data storage means and wireless communication means. The communication means typically comprises an antenna in the form of an electromagnetic coil (not shown). More generally the wireless communication means may comprise any wireless communication device(s) capable of supporting wireless communication. The data storage means may comprise any suitable electronic data storage device. In preferred embodiments, the RFID tag 401, or other device, is powered by an electromagnetic field that excites, in use, the antenna coil. In alternative embodiments, the RFID tag 401, or other device, may include its own power supply and may transmit data without necessarily having to be interrogated. Typically, the stored data relates to the tire on which the mount 402 is mounted in use. More generally the data may comprise tyre parameter data, vehicle parameter data and/or configuration data for the TPMS.

Conveniently, the RFID tag 401 is embedded in the mount 402. This may be achieved during manufacture of the mount 402. Alternatively, the tag 401 may be provided in a cavity formed in the mount 402, or be mounted on the mount 402.

In preferred embodiments, the tag 401 is located adjacent the cavity 404, preferably being spaced apart from the cavity 404 in a lateral direction, i.e. a direction perpendicular with the normal axis A-A', for example along axis B-B' as shown in FIG. 4. When the TPMS device 111 is in the mount 402, the RFID tag 401 is located beside the TPMS device 111, i.e. spaced apart from the TPMS device 111 in a lateral direction that is parallel with the rotational axis of the tire during use. Locating the tag 401 beside the TPMS device 111 is advantageous in that the TPMS device 111 does not exert a force on the tag 401 as the tire rotates, nor does the tag 401 interfere with the operation of the TPMS device 111 (e.g. when monitoring for distortions in the tire footprint indicative of changes such as tread wear), each of which could be problematic if the tag 401 were located between the TMPS device 111 and the tire. Providing the tag 401 on the mount 402 is also advantageous as it facilitates locating the tag 401 close to, preferably beside and more preferably immediately beside, the TPMS device 111 during use. Locating the tag 401 close to the TPMS device 111 is preferred as it facilitates minimising power consumption and communication between the tag 401 and TPMS device 111. Typically, the tag 401 is laterally spaced from the TPMS device 111 by a distance of between 1 mm and 15 mm.

In embodiments where the RFID tag 401 is not provided in the mount 402, for example being embedded in the tire on mounted on the tire independently of the TPMS device 111, it is still preferred that the tag 401 is located beside the TPMS device 111.

In use, the mount 402 is fixed to the internal surface of the tire, preferably in the tread area of the tire. This may be achieved by any convenient fixing means, e.g. adhesive or welding, or may be achieved by integrally forming the mount 402 with the tire. Typically, the base 409 of the mount 402 has a reverse surface 417, which is preferably substantially flat, by which the mount 402 can be fixed to the internal surface of the tire.

FIG. 4 also shows a programing tool 403 that can be used to program data into the memory of the RFID tag 401. The programming tool 403 can take any convenient conventional form so long as it can communicate wirelessly with the tag 401.

Figure 5:
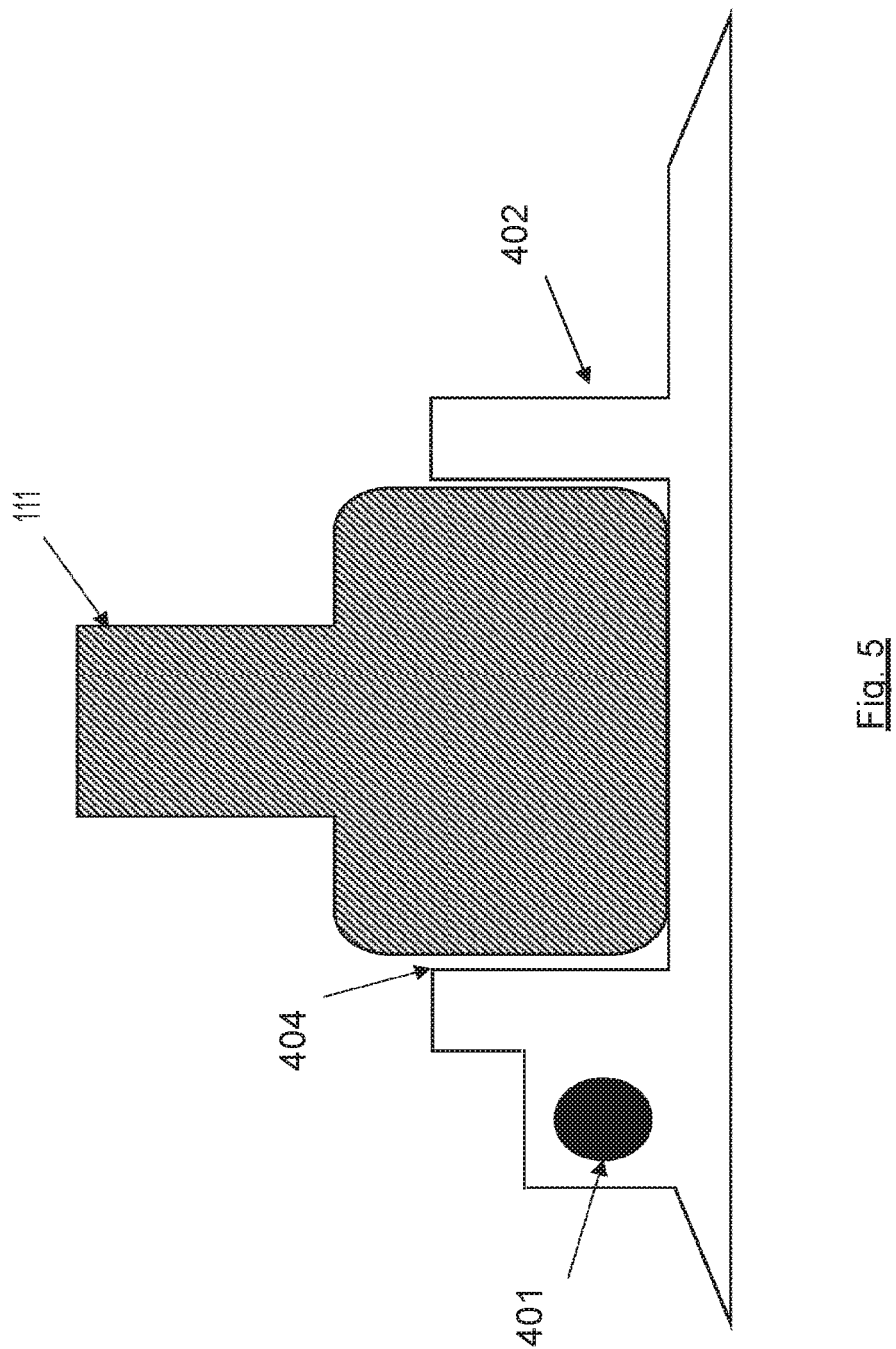
FIG. 5 shows the mount of FIG. 4 with the TPMS sensor present, illustrating an example of the relative positioning of the TPMS sensor and RFID tag in a shared mount.

FIG. 5 shows the mount 402 with the TPMS device 111 located in the cavity 404.

Figure 6:
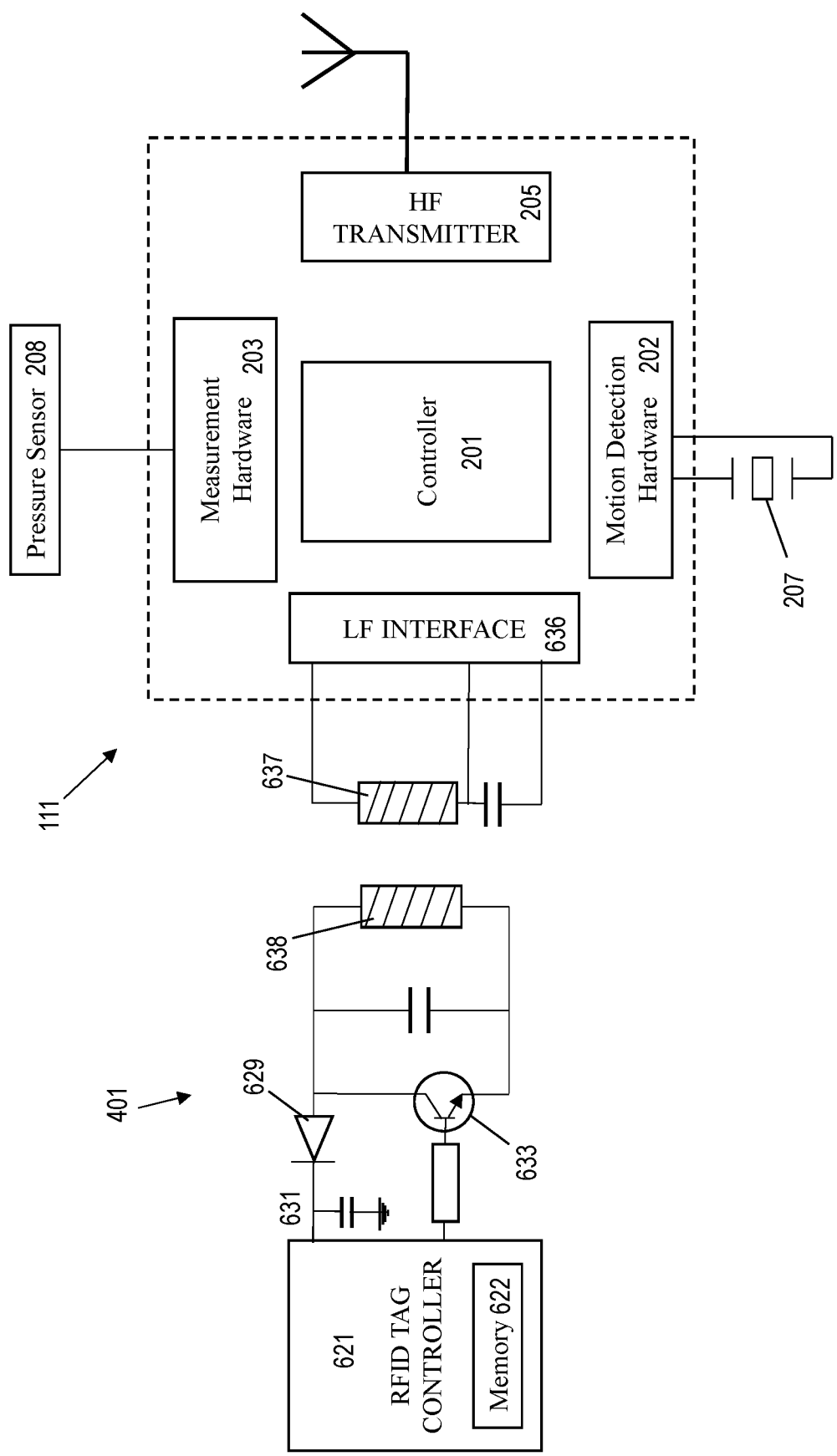
FIG. 6 shows a block diagram of one embodiment of a system including the RFID tag and TPMS device.

FIG. 6 shows a block diagram of the main components of an embodiment of a system comprising both the TPMS and RFID devices 111, 401. In FIG. 6, where relevant the same numerals are used as for FIG. 2 to denote the same or similar parts, and the same or a similar description applies as would be apparent to a skilled person.

The TPMS device 111 has a main controller 201. This may be a standard microcontroller or a custom Application Specific Integrated Circuit (ASIC). It typically includes standard components such as a microprocessor, a memory, Input/output interface and a clock oscillator. The measurement hardware 202 is used to measure pressure and/or temperature from the pressure sensor 208 or temperature sensor (not shown). The measurement hardware 203 typically comprises a filter, an amplifier and an analogue to digital converter (not shown). The motion detection hardware 202 is used to detect motion. It typically comprises one or more accelerometer or shock sensor 207 to monitor acceleration forces. The advantage of a component like an accelerometer or shock sensor, is that they are able to monitor more than just a binary change between a stationary and drive state; they are able to monitor changes in forces felt by the TPMS device 111 during motion. This is of particular use when the TPMS device 111 is mounted in the tread region of the tire and so is located in the tire footprint region depending on the rotational position of the wheel 101, as a number of component forces can be monitored that are indicative of vehicle and tire characteristics such as load distribution or tread depth.

In this embodiment, it is assumed that the tag 401 and TPMS device 111 include co-operable transponders having respective LF electromagnetic coils 638, 637 that support a wireless communication channel between the tag 401 and the device 111, at an LF operating frequency, for example 125 KHz. In typical embodiments, the tag 401 is a passive device that is powered by energy electromagnetically induced in its coil 638 in the presence of a suitable electromagnetic field, provided in this case by the coil 637 of the device 111. Typically, the tag 401 transmits data to the device 111, via the respective coils 638, 637 in response to an interrogation by the device 111.

The transponder 206 of the device 111 comprises an LF interface 636 for controlling the primary LF coil 637 and is responsible for both sending and receiving data on the LF channel using coil 637. The LF interface 636 is controlled by the main controller 201.

The UHF transmitter 205 is used to send ultra high frequency communications primarily to the vehicle ECU, this typically occurs at a frequency of 315 or 433 MHz. These communications will typically contain a combination of data stored in the TPMS devices memory, data measurements taken by the TPMS device 111 and data gathered from communication with the RFID tag 401.

The RFID tag comprises a controller 621, a memory 622 and the coil 638, together with associated circuitry. In response to being powered by the coil 638, the controller 621 is configured to read data from the memory and to cause the retrieved data to be transmitted by the coil 638. This involves modulating the signal exciting the coil with the retrieved data. The coil 638 is the main communication means and energy source of the tag 401 through coupling with external coils such as the coil 637 of the TPMS device 111. This coupling between the primary and secondary coils 637, 638 induces a resonant AC voltage in the secondary coil 638. This energy transfer is able to provide sufficient power to the RFID tag controller 621 to enable it to read data from the memory 622 to initiate a return communication and modulate the data onto the coil 638. Hence, the TPMS device 111 can interrogate the tag 401 and receive a response from the tag 401, the interrogation involving energising the device coil 637 to energise the tag coil 638 by electromagnetic coupling.

On the TPMS device 111 a tuning capacitor 625 is typically connected in series with the primary coil 637. In the RFID tag 401 a tuning capacitor 627 is typically connected in parallel with the secondary coil 638. A diode 629 and capacitor 631 are used to rectify the AC current induced in the secondary coil 638 during coupling for supply to the controller 621. A transistor 633 is typically provided to open and close a short circuit pathway to the secondary coil 638. This enables the RFID tag controller 621 to modulate data onto the secondary coil 638 through on-off keying. This modulation of the secondary coil 638 is detected by the primary coil 637 as an energy loading modulation of the LF field linking the coils, which in turn causes changes in the voltage across the primary coil 637. The LF interface 636 of the TPMS device 111 is able to detect these voltage changes and recover the data.

Figure 7:
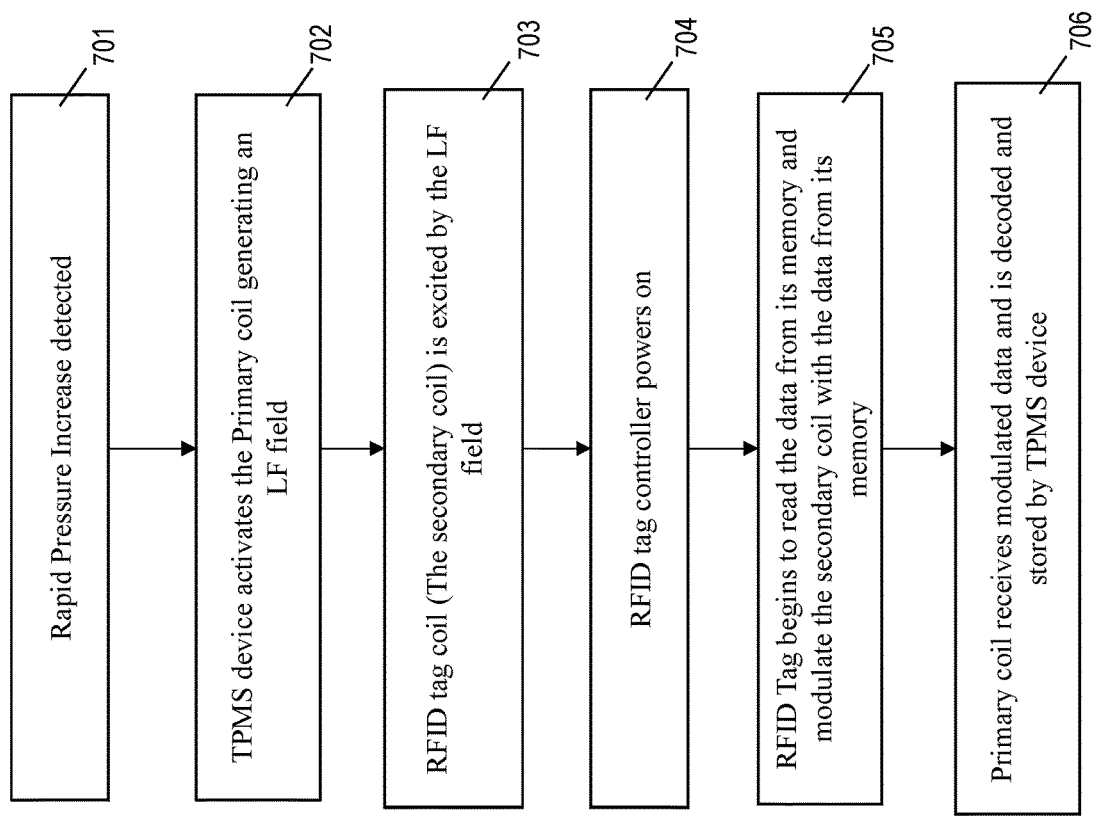
FIG. 7 shows a flowchart of an exemplary operation of the interaction between the TPMS device and the RFID tag.

FIG. 7 shows a flowchart of the key steps of one possible embodiment of activating the communication between the TPMS device 111 and RFID tag 401. Step 701 is the detection of a tire pressure event, for example a pressure increase, by the controller 201 of the TPMS device 111. This pressure increase may be indicative of a wheel installation, i.e. a tire inflation event. The controller 201 may be configured to determine on or more characteristics of a detected pressure changes, for example the magnitude of the change in pressure and/or the rate of change. This allows the controller 201 to distinguish a tire installation event from other events such as pressure rise due to temperature or vehicle load. Once the TPMS device 211 has determined that a relevant tire pressure event, which in this case is assumed to be a pressure increase indicative of a tire installation, has occurred, in step 702 the controller 201 enables the LF interface 636 of the TPMS device to generate an LF field. In step 703 the coil 608 of the RFID tag 401 receives energy from the TPMS device coil 607 by inductive coupling. Once a sufficient level of energy is transferred the RFID tag controller 621 is activated (step 704). The TPMS device 111 continues to radiate energy via the coil 607 throughout the communication process. Alternatively the RFID tag 401 could use the rectifying capacitor 614 as a charge reservoir. In such an embodiment if a sufficiently large capacitor is used, the TPMS device 111 would only need to supply energy during an initial phase to charge the reservoir capacitor, from which point the RFID tag controller 621 could use the charge stored in the reservoir capacitor for energy.

In step 705, the tag controller 621 reads data from its memory 622 and modulates the excitation of the coil 608 so that the retrieved data is transmitted by the coil 608. In step 706, the modulated LF field is detected by the coil 607 of the device 111 and the data is extracted by the LF interface 636 and communicated to the controller 201, In alternative embodiments (not illustrated) the tag 401 may be provided with dedicated wireless transmission means (not shown) such as an RF circuit tuned to, for example, 315 or 433 MHz. In such embodiments, the RFID tag 401 is able to transmit data independently of any coupling with the TPMS device 111.

In the present embodiment however communication of data from the RFID tag 401 to the TPMS device 111 is achieved by modulating the data onto the coil 608 of the RFID tag using, for example, On-Off keying (OOK) by momentarily shorting the coil 608 to create the off state. This creates perturbations in the field that can be detected on the primary coil 607. Other forms of modulation may also be used including other ASK methods, PSK or FSK. The means by which the RFID tag communicates with the TPMS device by modulating data onto its coil, may be similar the LF read back method described by U.S. Pat. No. 6,710,708, the main difference being that the coil 607 of the TPMS device 111 is the primary coil and the passive RFID tag 401 contains the secondary coil.

Figure 8:
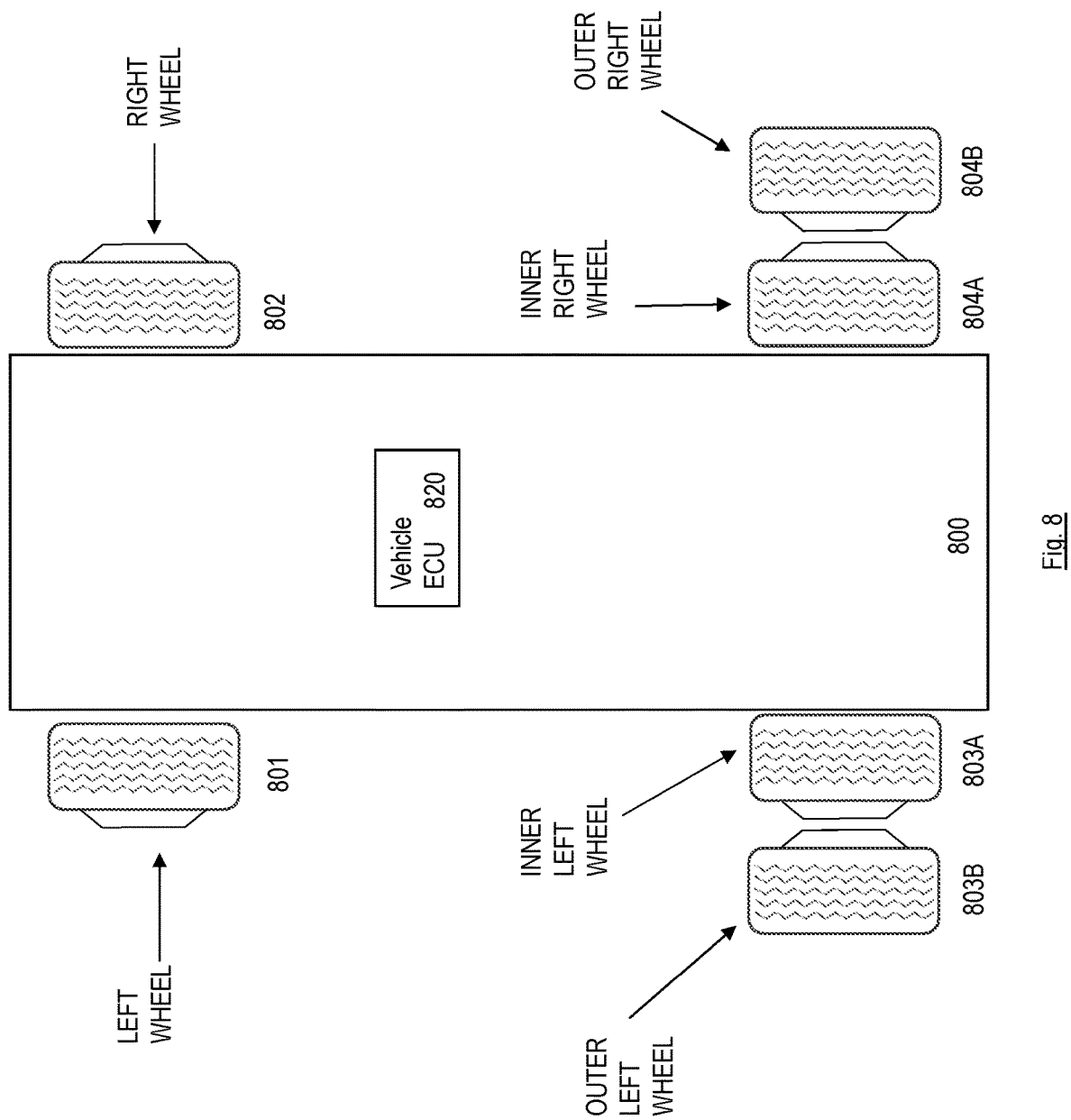
FIG. 8 is a schematic plan view of a vehicle with dual rear wheels.

FIG. 8 shows that layout of a vehicle 800 such as a truck or van having at least one set of dual wheels (rear wheels 803A, 803B and 804A, 804B in the present example). Dual wheels present a problem for tire mounted TPMS devices as the orientation of the TPMS device is not fixed by its mounting. Therefore a means for either having the TPMS device determine its orientation or informing the TPMS device of its orientation is required. The vehicle 800 has a central ECU 820 which is able to receive and decode transmissions from the TPMS devices (not shown) mounted in wheels 801, 802,803A, 803B, 804A and 804B. In this example only one set of dual wheels is shown, however it is possible that a large truck may have one or more additional sets of dual wheels. The dual wheel configuration comprises a set (or pair) of wheels mounted together (i.e. side by side and coaxially) but in opposite orientations. For example wheel 803A is mounted facing wheel 803B. This means a TPMS device installed correctly in wheel 803A should detected rotation in an opposite sense to the rotation detected by a TPMS device mounted correctly in wheel 803B. This is important for auto location routines which rely upon knowing the orientation of a TPMS device. However without a valve stem to limited the orientation which the device may be installed, the opportunity for error in installation increases.

Figure 9:
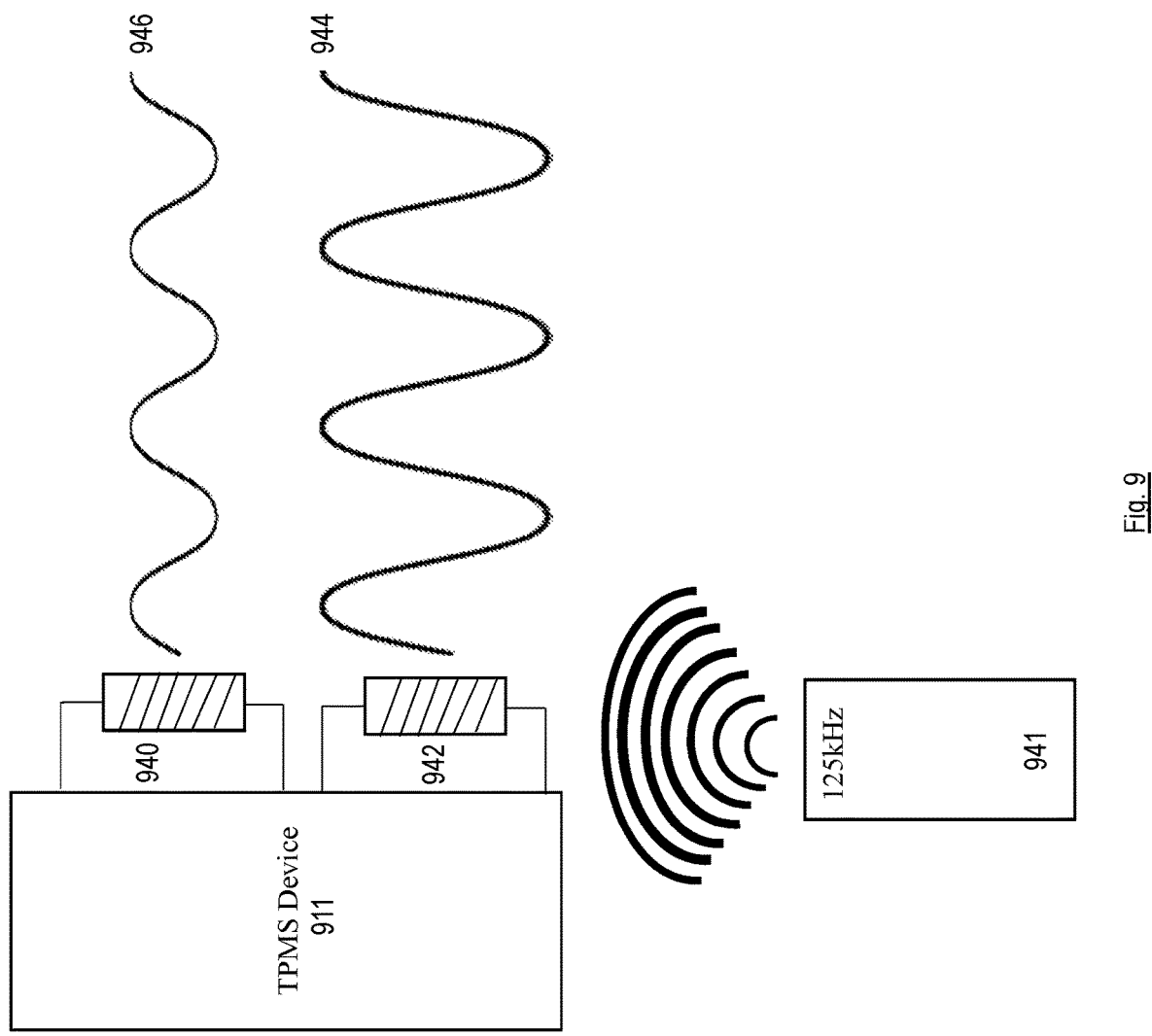
FIG. 9 is a schematic view of a TPMS sensor with two LF coils.

FIG. 9 shows a TPMS device 911 (which may be substantially the same as the TPMS device 111 except as now described) with two electromagnetic transponder coils, preferably LF coils 940, 942. The coils 940, 942 can be used to determine the orientation of the TPMS device 911 as is now described. If a LF field 944 (or other suitable EM field) is applied to the coils 940, 942, for example by a suitably equipped hand tool 941, the coil 942 that is closer to the source of the field 944 will detect a stronger field that the coil 940 than is further away from the source. To this end, the coils 940, 942 are spaced apart in the TPMS device 911 such that one will be further away than the other than any likely source of excitation field. Typically, the EM field is applied by a user positioned at a side of the vehicle 800, and so the coils 940, 942 are preferably spaced apart in direction that, when the TMPS device 911 is mounted on the tire, is parallel with the rotational axis of the wheel. In FIG. 4, this corresponds with the direction B-B'. In a typical case where the TPMS device 911 can be mounted (e.g. in mount 402) in one of two orientations separated by 180 degrees, the coils 940, 942 will be spaced apart in this direction irrespective of which orientation they are in.

Therefore assuming that the LF excitation field is applied from the outside of the vehicle 800 the outermost coil 942 will pick up a stronger field that the inner most coil 940. As field strength decreases with distance from the source, it is possible to determine which coil is closer to the source and therefore which coil is closer to the outside of the vehicle 800. This allows the orientation of the device 911 to be determined (i.e. the controller 201 of the TPMS device 911 can use respective field strength information detected by the LF interface 636 to determine which of two possible orientations (usually designated as left and right) it is in).

The LF field source 941 may be a gate reader or a hand tool. Based on the assumption that the source will always be on the outside of the vehicle 800 is possible to determine the orientation of a TPMS device with multiple coils that are spaced apart in relation to the LF field. The TPMS device 911 may comprise all the same major components as described in FIG. 2 or FIG. 6. The embodiment of FIG. 1 additionally has multiple (at least two) coils connected to its LF transponder or LF interface hardware. Coils 940 and 942 are mounted a sufficient distance apart so they experience a relative difference in field strength of the LF field propagated by the source 941. As a result the current induced across the coils 940, 942 will have a relative difference in magnitude. In this example coil 942 is mounted closer to the LF source 941 than coil 940. As a result the current induced across the coil 942 is of a greater magnitude. This is shown by the output signal 944 of the coil 942, which is of a higher amplitude than output signal 946 which represents the current induced across coil 940.

Figure 10:
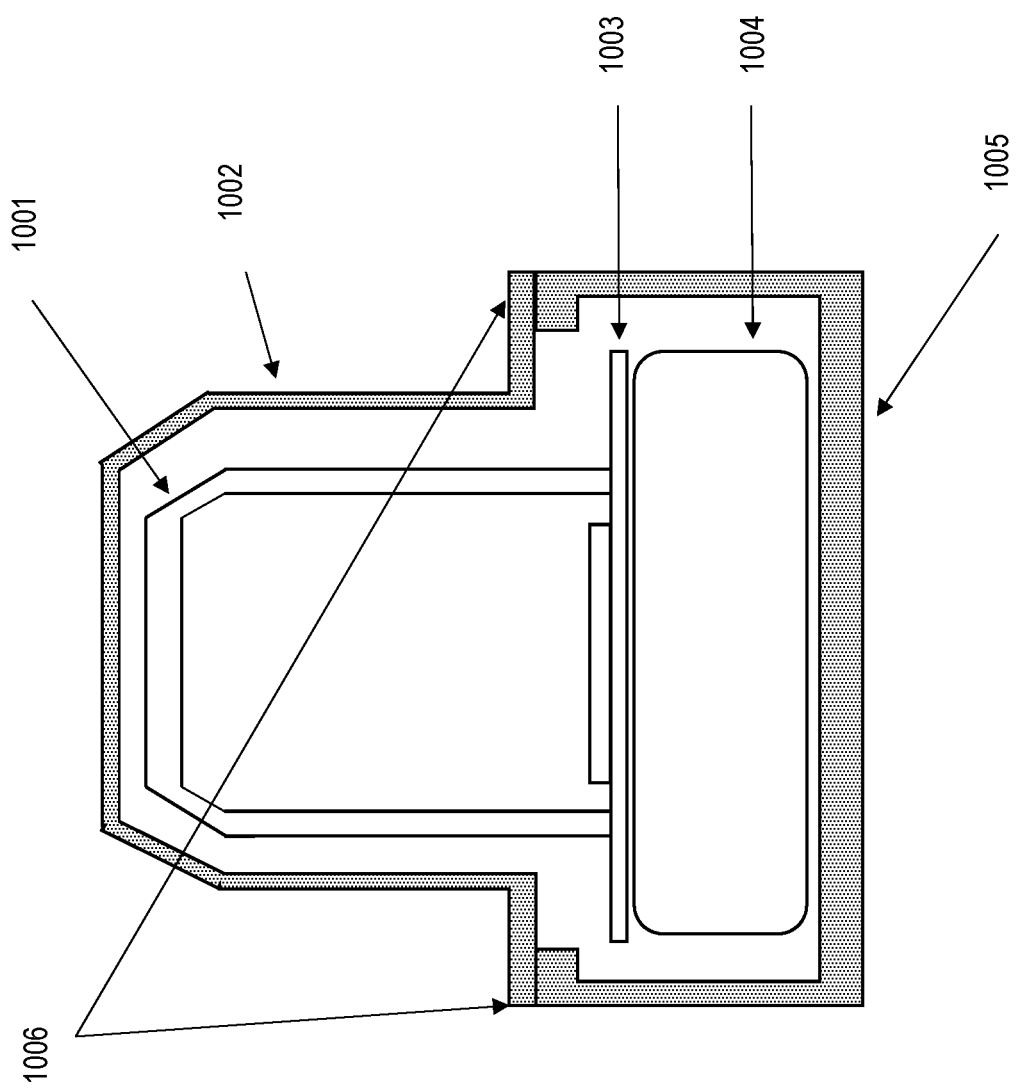
FIG. 10 shows an example of a laser welded enclosure.

FIG. 10 shows an example of a laser welded enclosure 1005 that is mountable on an internal surface, e.g. the sidewall, of a tire by placing the enclosure in a rubber attachment bung, or otherwise in an embodiment of the mount 402. The laser welded enclosure 1005 comprises a base 1007 and lid 1002, wherein the lid is laser welded to the base to create a protective enclosure. The electronics include a battery 1004 and PCB board 1003 with various components (for example as described above with reference to FIGS. 2, 6 and 9) and an antenna 1001. The base of the enclosure 1005 is preferably formed from a polymer material with an absorption agent such as carbon black included in its composition. The lid 1002 is preferably formed from a polymer material without any absorption agents included. The role of the absorption agent is to absorb laser light. In this example a Nd:YAG laser is used, to transmit Infra-red radiation, which carbon black readily absorbs. Upon absorption of the IR radiation the carbon black molecules are excited and heated causing the surrounding polymer to melt. This occurs at the interface 1006 between the lid and the base. The IR radiation passes easily through the lid and is absorbed by the carbon black molecules as soon as it enters the base, causing the interface region 1006 to heat and melt. As the polymer cools a bond is formed between the base and the lid ensuring a water tight seal to protect the electronics from moisture.

The invention is not limited to the embodiments described herein which may be modified or varied without departing from the scope of the invention.

The invention claimed is:
1. A tire pressure monitoring system comprising:
a tire pressure monitoring device for mounting on an internal surface of a tire and including a pressure sensor for monitoring the pressure of a fluid in the tire;
an electronic data storage device for location on said tire separately from said tire pressure monitoring device,
wherein said tire pressure monitoring device and said data storage device each includes wireless communication means for supporting wireless communication between each other,
wherein, in response to detecting a tire pressure event from monitoring the pressure of said fluid, said tire pressure monitoring device is configured to cause said electronic data storage device to transmit data that includes configuration data for one or more configurable parameters of the tire pressure monitoring device, and the tire pressure monitoring device being configured to receive the transmitted data from said electronic data storage device;
wherein said data storage device is provided, separately from said tire pressure monitoring device, in or on a mount for mounting to said internal surface of said tire, and
wherein tire pressure monitoring device further includes multiple transponder coils and is operable in an orientation determination mode to compare a respective amplitude of a respective signal induced in each of said transponder coils from a same low frequency excitation field and to determine an orientation of said tire pressure monitoring device based on said comparison, wherein the low frequency excitation field is in a low frequency (LF) range of 30 kHz to 300 kHz.

2. The system of claim 1, wherein said tire pressure monitoring device is configured to detect said tire pressure event upon detecting an increase in said fluid pressure corresponding to a tire inflation event.

3. The system of claim 1, wherein said tire pressure monitoring device is configured to detect said tire pressure event upon detecting an increase in said fluid pressure by more than a threshold amount and/or at higher than a threshold rate.

4. The system of claim 1, wherein said wireless communication means comprises a respective transponder at each of said tire pressure monitoring device and said data storage device, each respective transponder comprising a respective electromagnetic coil.

5. The system of claim 1 wherein said electronic data storage device is an RFID tag.

6. The system of claim 1, wherein said electronic data storage device comprises a memory for storing said data.

7. The system of claim 1 wherein said tire pressure monitoring device is configured to cause said electronic data storage device to transmit data by energizing a tire pressure monitoring device transponder, to create an electromagnetic field, said data storage device being configured to detect said electromagnetic field with a data storage device transponder, and to transmit said data in response to said detection.

8. The system of claim 7, wherein said data storage device is configured to transmit said data by modulating an excitation of the data storage device transponder.

9. The system of claim 1, wherein said electronic data storage device being provided in or on said mount a location that is beside said tire pressure monitoring device when said tire pressure monitoring device is fitted to said mount.

10. The system of any claim 9 wherein said mount includes a cavity for receiving said tire pressure monitoring device, said electronic data storage device being provided in or on said mount beside said cavity, and wherein, said electronic data storage device is spaced apart from said cavity in a direction that is parallel to a rotational axis of the tire.

11. The system of claim 1, wherein said electronic data storage device is provided on said tire a location that is beside said tire pressure monitoring device when said tire pressure monitoring device is mounted on said tire.

12. The system of claim 4, wherein said electronic data storage device is powered by electrical power induced in its transponder by an electromagnetic field.

13. The system of claim 1, wherein said multiple transponder coils includes first and second transponder coils spaced apart in a first direction, and wherein, said first direction is parallel with an axis of rotation of a wheel in which said tire pressure monitoring device is mounted.

14. The system of claim 13, wherein said multiple transponder coils further include at least one other transponder coil spaced apart from at least one of said first and second transponder coils in a direction perpendicular to said first direction, and wherein in said orientation determination mode said tire pressure monitoring device is further configured to compare a strength of a signal induced in said at least one other transponder coil and to determine an orientation of said tire pressure monitoring device and/or an orientation of a wheel in which said device is located, based on said comparison.

15. The system of claim 1, wherein said tire pressure monitoring device is provided in an enclosure having a base and a lid, the base and lid being fixed together by one or more laser welds.

16. The system of claim 1 wherein said electronic data storage device stores data indicative of one or more parameters relating to said tire and/or data indicative of one or more parameters relating to a vehicle.

17. The system of claim 1 wherein said electronic data storage device is located beside said tire pressure monitoring device.

18. The system of claim 1 wherein said electronic data storage device is spaced apart from said tire pressure monitoring device in a direction that is parallel to a rotational axis of the tire.

19. A tire monitoring device for mounting on an internal surface of a tire, the device comprising first and second transponder coils spaced apart in a first direction, said tire pressure monitoring device being operable in an orientation determination mode in which it is configured to compare a respective amplitude of a respective signal induced in each of said transponder coils from a same low frequency excitation field applied from outside of the tire and to determine an orientation of said tire pressure monitoring device and/or an orientation of a wheel in which said device is located, based on said comparison, wherein the low frequency excitation field is in a low frequency (LF) range of 30 kHz to 300 kHz.

* * * * *